(12) United States Patent
Cheng et al.

(10) Patent No.: US 10,048,870 B2
(45) Date of Patent: *Aug. 14, 2018

(54) ELECTRONIC SYSTEM AND DATA MAINTENANCE METHOD THEREOF

(71) Applicant: Silicon Motion, Inc., Jhubei, Hsinchu County (TW)

(72) Inventors: Chang-Kai Cheng, Hsinchu (TW); Yu-Chih Lin, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/844,890

(22) Filed: Dec. 18, 2017

(65) Prior Publication Data

US 2018/0107405 A1    Apr. 19, 2018

Related U.S. Application Data

(63) Continuation of application No. 15/618,232, filed on Jun. 9, 2017, now Pat. No. 9,875,032.

(30) Foreign Application Priority Data

Jun. 21, 2016   (TW) ............................... 105119405 A

(51) Int. Cl.
*G11C 7/00* (2006.01)
*G06F 3/06* (2006.01)

(52) U.S. Cl.
CPC ............ *G06F 3/0608* (2013.01); *G06F 3/064* (2013.01); *G06F 3/0653* (2013.01); *G06F 3/0658* (2013.01); *G06F 3/0659* (2013.01); *G06F 3/0679* (2013.01)

(58) Field of Classification Search
CPC ....... G11C 7/22; G11C 7/222; G11C 11/4076; G11C 7/1051; G11C 11/0476
USPC ......................................................... 365/194
See application file for complete search history.

(56) References Cited

U.S. PATENT DOCUMENTS

| | | | |
|---|---|---|---|
| 9,875,032 B2 * | 1/2018 | Cheng | G06F 3/0608 |
| 2012/0195316 A1 | 8/2012 | George et al. | |
| 2015/0243338 A1 * | 8/2015 | Sohn | G11C 11/406 |
| | | | 365/189.05 |

* cited by examiner

*Primary Examiner* — Son Dinh
(74) *Attorney, Agent, or Firm* — McClure, Qualey & Rodack, LLP

(57) ABSTRACT

In one implementation, an electronic system includes a host and a data storage device. The data storage device includes a flash memory, a controller and a delay circuit. The controller is configured to receive a read command from the host, read a first data sector from the flash memory according to the read command, and produce a setting signal according to a maintenance time of the flash memory when the flash memory needs to be maintained. The delay circuit is configured to receive the setting signal from the controller, divide the first data sector into a plurality of first sub-data sectors according to the setting signal, and transmit at least one of the first sub-data sectors to the host at a predetermined time interval for extending a busy time of the controller.

14 Claims, 4 Drawing Sheets

ELECTRONIC SYSTEM AND DATA MAINTENANCE METHOD THEREOF

CROSS REFERENCE TO RELATED APPLICATIONS

This Application is a Continuation of pending U.S. patent application Ser. No. 15/618,232, filed on Jun. 9, 2017, now U.S. Pat. No. 9,875,032, which claims priority of Taiwan Patent Application No. 105119405, filed on Jun. 21, 2016, the entirety of which is incorporated by reference herein.

BACKGROUND OF THE INVENTION

Field of the Invention

The present invention relates to a data reading method of a data storage device, and in particular to a data reading method capable of extending busy time.

Description of the Related Art

Flash memory is considered a non-volatile data storage device, using electrical methods to erase and program itself. Using NAND Flash as an example, it is often used in memory cards, USB flash devices, solid state devices, eMMC, and for other uses.

Flash memory such as NAND Flash uses a multiple-block structure to store data. Each block contains multiple pages, wherein the write unit of the flash memory is the page, and the erase unit of the flash memory is the block. The time that can be used to maintain the flash memory is limited due to the specification of eMMC. Therefore, the maintenance tasks cannot be finished, and the data of the flash memory cannot be preserved well.

BRIEF SUMMARY OF THE INVENTION

A detailed description is given in the following embodiments with reference to the accompanying drawings.

An exemplary embodiment provides a data storage device including a flash memory, a controller and a delay circuit. The controller receives a read command from a host, reads a first data sector from the flash memory according to the read command, and produces a setting signal according to the maintenance time of the flash memory when the flash memory needs to be maintained. The delay circuit receives the setting signal from the controller, divides the first data sector into a plurality of first sub-data sectors according to the setting signal, and transmits at least one of the first sub-data sectors to the host at a predetermined time interval for extending the busy time of the controller.

Another exemplary embodiment provides a data maintenance method applied to a data storage device having a flash memory. The data maintenance method includes: reading a first data sector from the flash memory according to a read command received from a host; producing a setting signal according to the maintenance time of the flash memory when the flash memory needs to be maintained; and enabling a delay circuit according to the setting signal to divide the first data sector into a plurality of first sub-data sectors and transmit at least one of the first sub-data sectors to the host at a predetermined time interval for extending the busy time of the controller.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
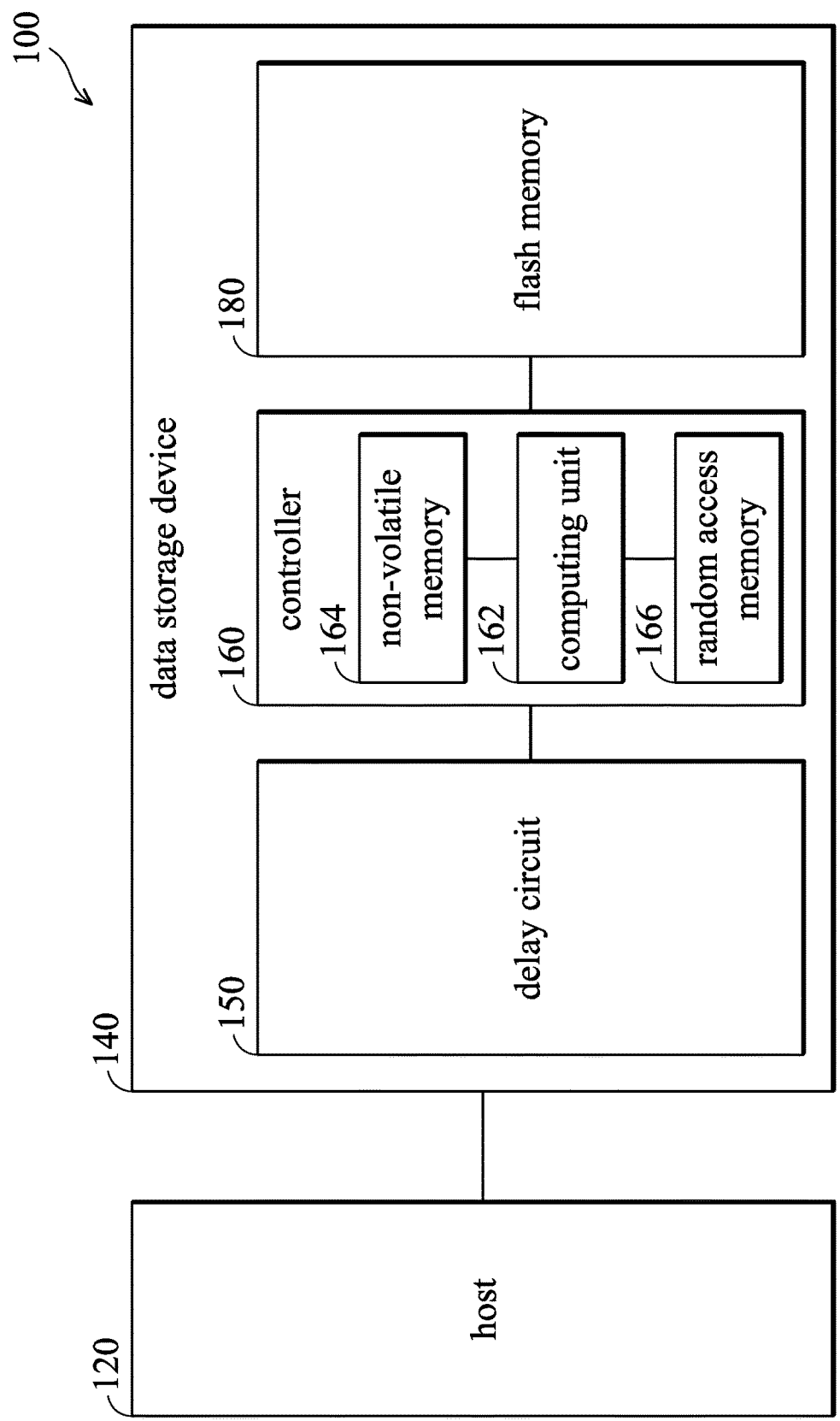
FIG. 1 is a schematic diagram illustrating an electronic system in accordance with some embodiments.

FIG. 1 is a schematic diagram illustrating an electronic system in accordance with some embodiments. The electronic system 100 includes a host 120 and a data storage device 140. The data storage device 140 includes a flash memory 180 and a controller 160, and operates in response to the commands of the host 120.

The delay circuit 150 is a hardware circuit constituted by logic gates, registers, transistors, resistors, capacitors and/or inductors. In some of the embodiments, the delay circuit 150 also can be an integrated circuit. The delay circuit 150 is arranged to divide data and dynamically adjust the period between data transmissions.

The controller 160 includes a computing unit 162, a non-volatile memory 164 (ROM), and a random access memory 166 (RAM). The non-volatile memory 164, the program code stored in the non-volatile memory 164 and data stored in the non-volatile memory 164 constitute firmware executed by the processing unit 162, and the controller 160 is configured to control the flash memory 180 based on the firmware.

The flash memory 180 includes a plurality of blocks, and each of the blocks has a plurality of pages. The write unit of the flash memory is the page, and the erase unit of the flash memory is the block.

It should be noted that the data storage device 140 is compatible with specification of Embedded Multi Media Card (eMMC), and the data transmissions of the data storage device 140 should meet the requirements of the specification of eMMC, wherein the requirements of the specification of eMMC is for various memory devices. In one embodiment, the data storage device 140 meets the specification of Embedded Multi Media Card. More specifically, the specification of Embedded Multi Media Card includes having to transmit the data from the data storage device 140 to the host 120 within a predetermined time limit after the host transmits the read command to the data storage device 140. For example, the predetermined time limit may be 100 milliseconds, but it is not limited thereto. In other embodiments, the predetermined time limit is another value required by other specifications. Moreover, when the data sector which is going to be read by the host 120 is more than one page, the controller 160 reads a part of the data sector of a page, and reads another part of the data sector of the next page after the prior read data of the previous page is transmitted to the host 120, but it is not limited thereto. In other embodiments, the controller 160 can also read more than two pages at the same time, and select the data that is required by the host 120 from the read data. The controller 160 transmits the read data to the host 120 when the amount of data that is required to be read has reached one page, and reads the data of other pages after transmitting the data to the host 120.

Figure 2:
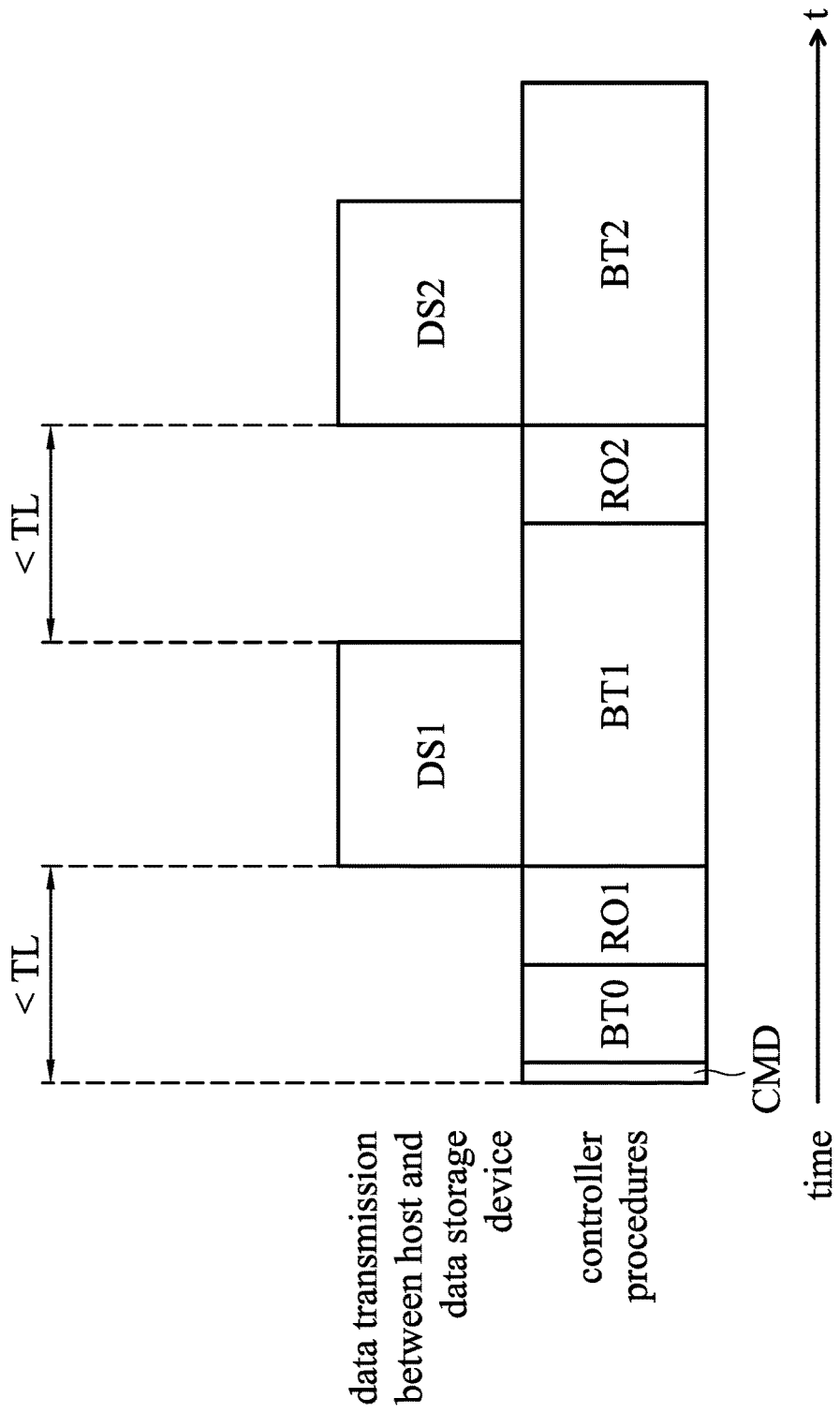
FIG. 2 is a schematic diagram illustrating data transmission under the specification of Embedded Multi Media Card in accordance with some embodiments.

FIG. 2 is a schematic diagram illustrating data transmission under the specification of Embedded Multi Media Card in accordance with some embodiments. As shown in FIG. 2, the controller 160 receives a read command from the host 120, wherein the read command is arranged to read a first data sector DS1 and a second data sector DS2 from the flash memory 180. In this embodiment, the memory space of each of the pages in the flash memory 180 is 32K Bytes, the first data sector DS1 is 32K Bytes, and the second data sector DS2 is also 32K Bytes, but it is not limited thereto. In other embodiments, the memory space of each of the pages in the flash memory 180 is 8K Kbytes, or 16K Bytes, etc. Moreover, in other embodiments, the read command can also read data from the flash memory 180 using another unit. After receiving the read command, the controller 160 parses the read command in the command-parsing procedure CMD, and respectively reads the first data sector DS1 and the second data sector DS2 from the flash memory 180 in the read procedure RO1 and the read procedure RO2 according to the parsed read command. Moreover, the controller 160 further enables the first data sector DS1 and the second data sector DS2 to be transmitted to the host 120. Generally, the controller 160 uses the time that the data is being transmitted to the host 120 or the extra time after the read command is parsed to maintain the data in the flash memory (error handle) in the background, wherein the period that is used to do the maintenance (error handle) is called "Busy Time". The maintenance (error handle) includes updating the data which has high error bits, moving the data which has been read over a predetermined threshold, etc. However, in the specification of Embedded Multi Media Card, the period between any two data transmissions has to be shorter than a predetermined time limit TL. Namely, the time between when the read command is transmitted from the host 120 to the data storage device 140 and when the first data sector DS1 is transmitted from the data storage device 140 to the host 120 has to be shorter than the predetermined time limit TL. Also, the time between when the first data sector DS1 is completely received by the host 120 and when any part of the second data sector DS2 is received by the host 120 from the data storage device 140 has to be shorter than the predetermined time limit TL. Therefore, the busy times BT0~BT2 that can be used by the controller 160 to do the data maintenance is limited by the specification, and as a result the controller 160 probably cannot finish the data maintenance in time. It should be noted that the above embodiment does not need a delay circuit 150.

In view of this, the present invention provides another embodiment to extend the busy time of the controller 160. In this embodiment, the controller 160 receives a read command from the host 120, and reads a first data sector from the flash memory 180 according to the read command. When the flash memory 180 needs to be maintained, the controller 160 produces a setting signal according to the maintenance time of the flash memory 180, wherein the setting signal is arranged to enable the delay circuit 150 and is arranged to set up the predetermined time interval of the delay circuit 150 according to the maintenance time, wherein the predetermined time interval is dynamically adjusted. Moreover, the controller 160 determines that the flash memory 180 needs to be maintained when the first data sector needs to be updated or moved. The controller 160 determines that the flash memory 180 does not need to be maintained when the first data sector does not need to be updated or moved. It should be noted that the controller 160 may determine the maintenance time according to how much the flash memory 180 needs to be updated or moved, and determine the predetermined time interval according to the maintenance time and a first number, wherein when the predetermined time interval is longer than a predetermined time limit, the controller 160 uses the predetermined time limit as the predetermined time interval.

In this embodiment, the delay circuit 150 receives the setting signal from the controller 16, and divides the first data sector into a plurality of first sub-data sectors according to the setting signal, and transmits at least one first sub-data sector to the host 120 at a predetermined time interval for extending the busy time of the controller 160, wherein the delay circuit 150 divides the first data sector into the first number of first sub-data sectors according to a predetermined length, and the length of each of the first sub-data sectors is the predetermined length.

In one of the embodiments, the length of each of the first data sectors is equal to the memory space of one page, and the predetermined length is the minimum data transfer unit of the specification of Embedded Multi Media Card. For example, the first data sector can be "DS1" or "DS2" in FIG. 2. Moreover, the controller 160 may determine the predetermined time interval according to formula (1):

$$M=(T-C)/(N-1)$$  formula (1)

wherein, "M" is the predetermined time interval, "T" is the time that the data maintenance procedure requires, "C" is the time taken by the data maintenance procedure, and "N" is the number of the first sub-data sectors. If a page can contain 32K Bytes and the minimum data transfer unit of the specification of Embedded Multi Media Card is 512 Bytes, the delay circuit 150 divides the first data sector which is 32K Bytes into 64 first sub-data sectors, wherein each of the first sub-data sectors is 512 Bytes, and "N" is 64.

Figure 3:
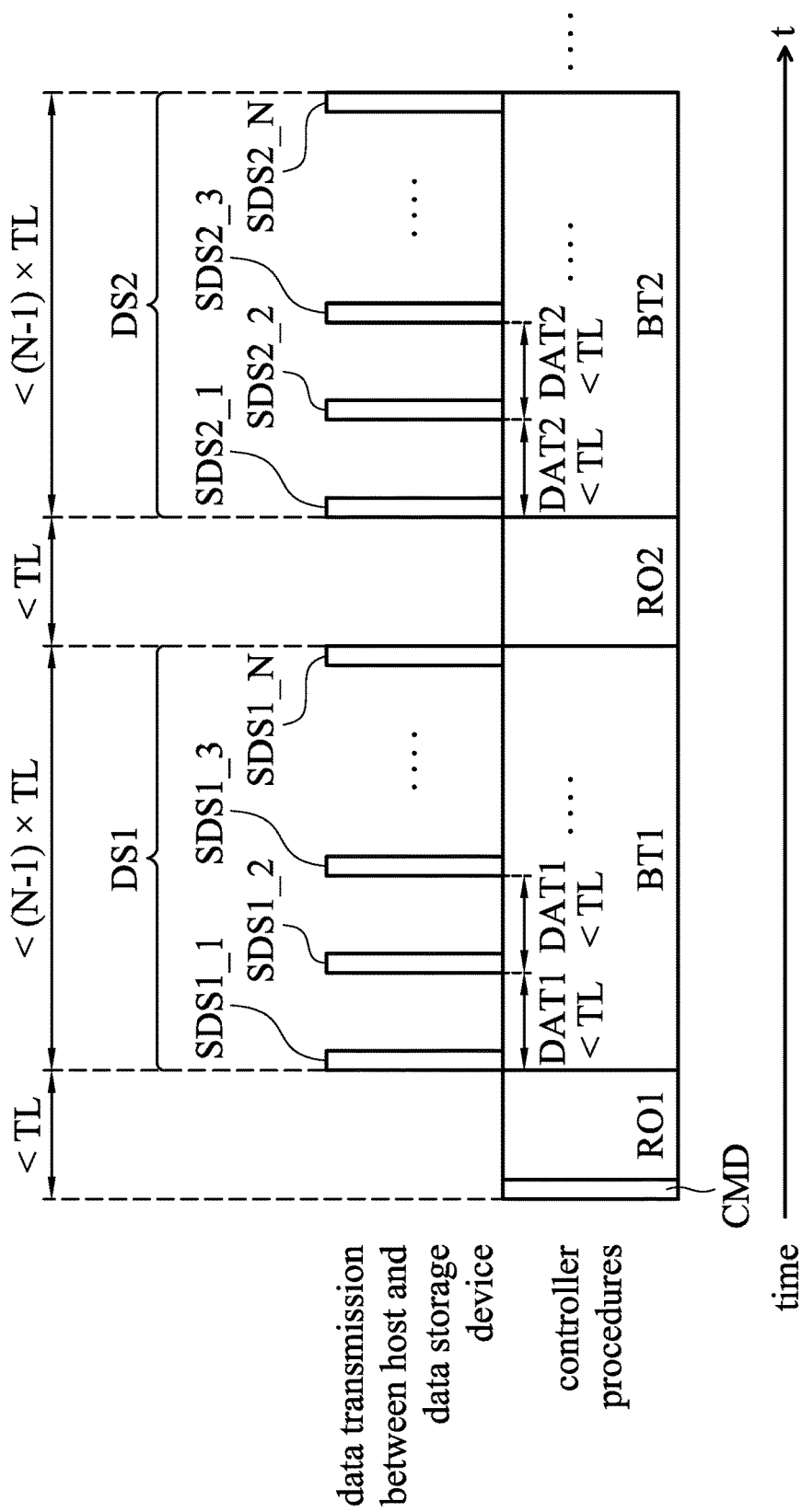
FIG. 3 is a schematic diagram illustrating another data transmission under the specification of Embedded Multi Media Card in accordance with some embodiments.

FIG. 3 is a schematic diagram illustrating another data transmission under the specification of Embedded Multi Media Card in accordance with some embodiments. As shown in FIG. 3, the controller 160 receives a read command from the host 120, wherein the read command is arranged to read a first data sector DS1 and a second data sector DS2 from the flash memory 180. In another embodiment, the read command can be arranged to read other data sectors. After receiving the read command, the controller 160 parses the read command in the command-parsing procedure CMD. Next, in the read procedure RO1, the controller 160 reads the first data sector DS1 from the flash memory 180, and determines whether the flash memory 180 needs to be maintained after all of the first data sector DS1 is read. When the flash memory 180 needs to be maintained, the controller 160 produces a first setting signal according to how much maintenance time the flash memory 180 needs. After the first setting signal is produced and the first setting signal is transmitted to the delay circuit 150, the controller 160 enters the busy time BT1 to maintain the data of the flash memory 180. At the same time, the delay circuit 150 starts to divide the first data sector DS1, and transmits the first sub-data sectors SDS1_1~SDS1_N produced by dividing the first data sector DS1 to the host 120 according to a first predetermined time interval DAT1 indicated by the first setting signal, wherein the first predetermined time interval DAT1 is shorter than the predetermined time limit TL. It should be noted that the data transmission and data division are performed by the delay circuit 150. For the controller 160, the controller 160 still reads data by the unit of a page, and transmit data by the unit of a page to the host 120. After the last first sub-data sector SDS1_N is transmitted, the controller 160 performs the read procedure RO2. In the read procedure RO2, the controller 160 reads the second data sector DS2 from the flash memory 180, and determines whether the flash memory 180 needs to be maintained after the second data sector DS2 is read. When the flash memory 180 needs to be maintained, the controller 160 produces a second setting signal according to how much maintenance time the flash memory 180 needs. After producing the second setting signal and transmitting the second setting signal to the delay circuit 150, the controller 160 enters the busy time BT2 to maintain the data of the flash memory 180. At the same time, the delay circuit 150 starts to divide the second data sector DS2, and transmits the second sub-data sectors SDS2_1~SDS2_N produced by dividing the second data sector DS2 to the host 120 according to a second predetermined time interval DAT2 indicated by the second setting signal, wherein the second predetermined time interval DAT2 is shorter than the predetermined time limit TL. It should be noted that the first predetermined time interval DAT1 and the predetermined time interval DAT2 can be different based on the amount of data to be read when the setting signal is produced.

As shown in FIG. 3, in this embodiment, the busy time of the controller 160 can be extended to "(N−1)*TL". Therefore, the controller 160 has enough time to do data maintenance.

Figure 4:
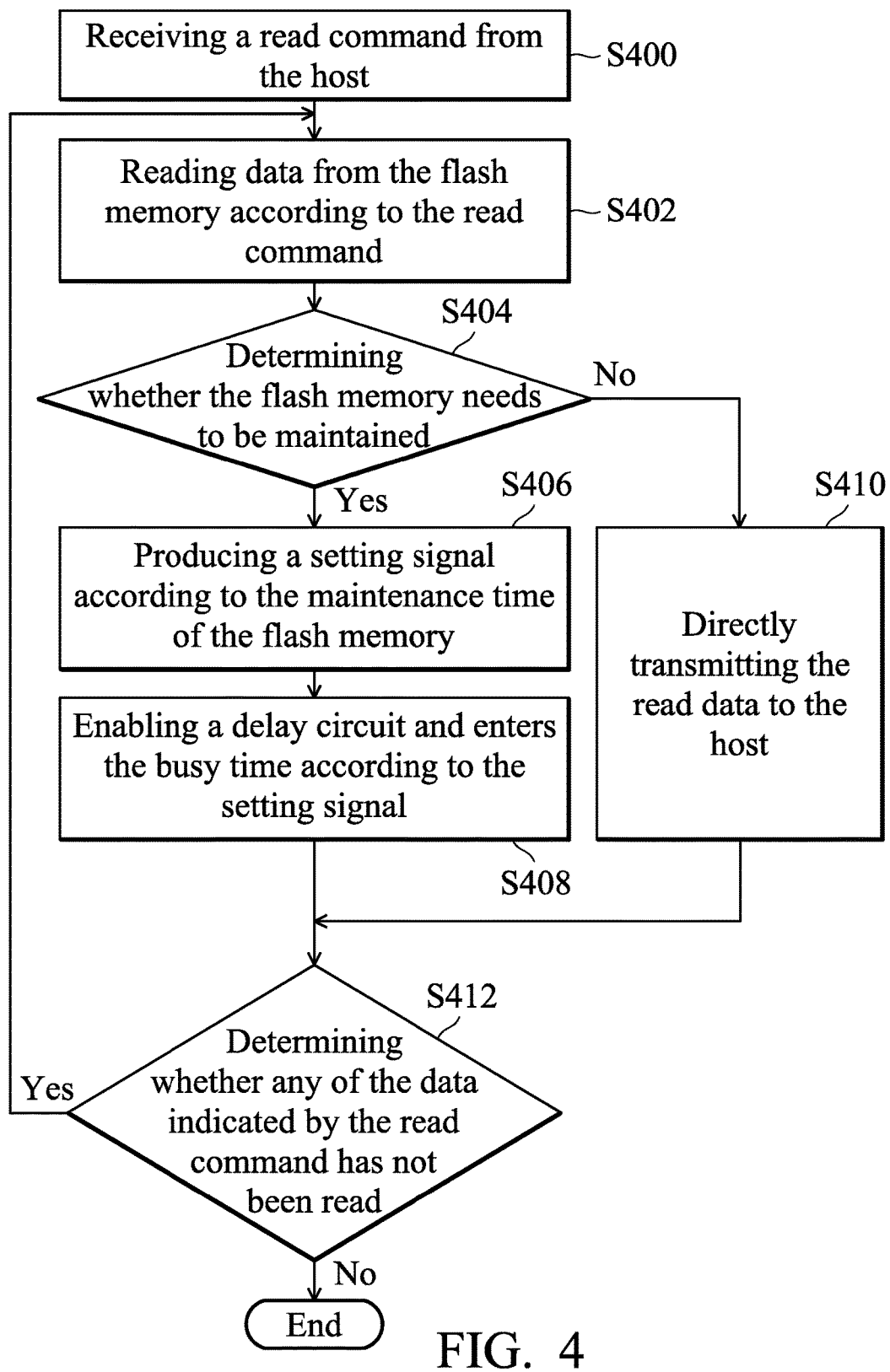
FIG. 4 is a flowchart of a data reading method in accordance with an embodiment.

FIG. 4 is a flowchart of a data reading method in accordance with an embodiment. The data maintenance method is applied to the data storage device 140 of FIG. 1 for extending the busy time of the controller 160, as shown in FIG. 3. It should be noted that the data storage device 140 is compatible with a specific specification and executes the data transmission under the specific specification. In one of the embodiments, the data storage device 140 is compatible with Embedded Multi Media Card (eMMC). More specifically, the specification of Embedded Multi Media Card includes having to transmit the data from the data storage device 140 to the host 120 within a predetermined time limit after the host transmits the read command to the data storage device 140. For example, the predetermined time limit may be 100 milliseconds, but it is not limited thereto. In other embodiments, the predetermined time limit is another value required by other specifications. The process starts at step S400.

In step S400, the controller 160 receives a read command from the host 120, wherein the read command is arranged to read the data sector DS1 from the flash memory 180.

Next, in step S402, the controller 160 reads data from the flash memory 180 according to the read command. It should be noted that when the data sector which is going to be read by the host 120 is more than one page, the controller 160 reads a part of the data sector of a page, and reads another part of the data sector of the next page after the prior read data of the previous page is transmitted to the host 120. In other embodiments, the controller 160 can also read more than one page of data at the same time, and select the data that is required by the host 120 from the read data. The controller 160 transmits the read data to the host 120 when the amount of data that needs to be read has reached one page, and reads the data of other pages after transmitting the data to the host 120. Therefore, in step S402, the controller 160 only reads data in units of a single page.

Next, in step S404, the controller 160 determines whether the flash memory 180 needs to be maintained. In one embodiment, in step S402, the controller 160 determines that the flash memory 180 needs to be maintained when the first data sector needs to be updated or moved. In step S402, the controller 160 determines that the flash memory 180 does not need to be maintained when the first data sector does not need to be updated or moved, but it is not limited thereto. In another embodiment, any of the data in the flash memory 180 needs to be maintained, the controller 160 determines that the flash memory 180 needs to be maintained. It should be noted that when the error bits of data in a page is higher than a predetermined value or the read count of the data in a page is higher than another predetermined value, the data needs to be maintained. When the flash memory 180 needs to be maintained, the process goes to step S406, otherwise, the process goes to step S410.

In step S406, the controller 160 produces a setting signal according to the maintenance time of the flash memory 180. The setting signal is arranged to enable the delay circuit 150 and is arranged to set up the predetermined time interval of the delay circuit 150 according to the maintenance time. More specifically, the controller 160 is arranged to determine the maintenance time according to the amount of data that needs to be updated or moved in the flash memory 180, and determines the predetermined time interval included in the setting signal according to the maintenance time and a first number, wherein when the predetermined time interval is longer than the predetermined time limit, the controller 160 uses the predetermined time limit as the predetermined time interval.

Next, in step S408, the controller 160 enables a delay circuit 150 and enters the busy time according to the setting signal. The controller 160 transmits the setting signal to the delay circuit 150 to enable the delay circuit 150 to divide the first data sector into a plurality of first sub-data sectors, and transmits at least one of the first sub-data sectors to the host 120 at a predetermined time interval for extending the busy time of the controller 160 of the data storage device 140, wherein the delay circuit 150 divides the first data sector into a first number of first sub-data sectors of a predetermined length, and the length of each of the first sub-data sectors is the predetermined length. Moreover, the controller 160 is arranged to update and move data of the flash memory 180 in the busy time. For details, refer to FIG. 3.

In step S410, the controller 160 directly transmits the read data to the host 120. Namely, in the step S410, the delay circuit 150 is not enabled, and the data is not transmitted to the host 120 through the delay circuit 150.

Next, in step S412, the controller 160 determines whether any of the data indicated by the read command has not been read. When any of the data indicated by the read command has not been read, the process goes to step S402, otherwise, the process ends at step S412.

The data storage device and the data maintenance method of the present invention can extend the busy time of the controller by a delay circuit under the specific specification.

Data transmission methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic system, comprising:
    a host; and
    a data storage device, comprising:
        a flash memory;
        a controller, receiving a read command from the host, reading a first data sector from the flash memory according to the read command, and producing a setting signal according to a maintenance time of the flash memory when the flash memory needs to be maintained; and
        a delay circuit, receiving the setting signal from the controller, dividing the first data sector into a plurality of first sub-data sectors according to the setting signal, and transmitting at least one of the first sub-data sectors to the host at a predetermined time interval for extending a busy time of the controller.

2. The electronic system as claimed in claim 1, wherein the setting signal is arranged to enable the delay circuit and arranged to set up the predetermined time interval according to the maintenance time.

3. The electronic system as claimed in claim 1, wherein the controller determines that the flash memory needs to be maintained when the first data sector needs to be updated or moved, and the controller determines that the flash memory does not need to be maintained when the first data sector does not need to be updated or moved.

4. The electronic system as claimed in claim 1, wherein the delay circuit divides the first data sector into a first number of the first sub-data sectors according to a predetermined length, and length of each of the first sub-data sectors is equal to the predetermined length.

5. The electronic system as claimed in claim 4, wherein the controller determines the maintenance time according to how much the flash memory needs to be updated or moved, and determines the predetermined time interval according to the first number and the maintenance time, wherein when the predetermined time interval is longer than a predetermined time limit, the controller uses the length of the predetermined time limit as the predetermined time interval.

6. The electronic system as claimed in claim 5, wherein the data storage device is compatible with specification of Embedded Multi Media Card, the specification of Embedded Multi Media Card requires that the data needs to be transmitted to the host from the data storage device within the predetermined time limit.

7. The electronic system as claimed in claim 5, wherein in the busy time, the controller further re-organizes the data of the flash memory that needs to be updated or moved.

8. A data maintenance method, applied to an electronic system comprising a host and a data storage device having a flash memory, the method comprising:
    reading a first data sector from the flash memory according to a read command received from the host;
    producing a setting signal according to a maintenance time of the flash memory when the flash memory needs to be maintained; and
        enabling a delay circuit according to the setting signal to divide the first data sector into a plurality of first sub-data sectors and transmit at least one of the first sub-data sectors to the host at a predetermined time interval for extending a busy time of a controller.

9. The data maintenance method as claimed in claim 8, wherein the setting signal is arranged to enable the delay circuit and arranged to set up the predetermined time interval according to the maintenance time.

10. The data maintenance method as claimed in claim 8, wherein the flash memory needs to be maintained when the first data sector needs to be updated or moved, and the flash memory does not need to be maintained when the first data sector does not need to be updated or moved.

11. The data maintenance method as claimed in claim 8, wherein the step of dividing the first data sector into the first sub-data sectors further comprises dividing the first data sector into a first number of the first sub-data sectors according to a predetermined length, wherein length of each of the first sub-data sectors is equal to the predetermined length.

12. The data maintenance method as claimed in claim 11, further comprising determining the maintenance time according to how much the flash memory needs to be updated or moved, and determining the predetermined time interval according to the first number and the maintenance time, wherein when the predetermined time interval is longer than a predetermined time limit, the length of the predetermined time limit serves as the predetermined time interval.

13. The data maintenance method as claimed in claim 12, wherein the data storage device is compatible with specification of Embedded Multi Media Card, the specification of Embedded Multi Media Card requires that the data needs to be transmitted to the host from the data storage device within the predetermined time limit.

14. The data maintenance method as claimed in claim 12, further comprising re-organizing the data of the flash memory that needs to be updated or moved in the busy time.

\* \* \* \* \*